United States Patent [19]

Schmidt et al.

[11] Patent Number: 4,818,217

[45] Date of Patent: Apr. 4, 1989

[54] INJECTION MOLDING SYSTEM WITH NOZZLES IN TANDEM

[75] Inventors: Harald H. Schmidt, Acton; Michael C. McEnroe, Georgetown, both of Canada

[73] Assignee: Mold-Masters Limited, Georgetown, Canada

[21] Appl. No.: 191,882

[22] Filed: May 9, 1988

[30] Foreign Application Priority Data

Apr. 13, 1988 [CA] Canada ............................ 563982

[51] Int. Cl.⁴ ............................................ B29C 45/22
[52] U.S. Cl. ............................ 425/549; 264/328.15; 425/56; 425/570; 425/572; 425/588
[58] Field of Search ............... 425/547, 549, 568, 570, 425/572, 588; 264/328.15

[56] References Cited

U.S. PATENT DOCUMENTS

| | | | |
|---|---|---|---|
| 4,238,671 | 12/1980 | Gellert | 219/421 |
| 4,286,941 | 9/1981 | Gellert | 425/566 |
| 4,403,405 | 9/1983 | Gellert | 29/611 |
| 4,557,685 | 12/1985 | Gellert | 425/549 |
| 4,579,520 | 4/1986 | Gellert | 425/549 |

Primary Examiner—Jay H. Woo
Assistant Examiner—Timothy Heitbrink
Attorney, Agent, or Firm—Riches, McKenzie & Herbert

[57] ABSTRACT

This invention relates to an injection molding system having two heated nozzles mounted in tandem. The rearward nozzle is considerably longer than the forward nozzle and has a melt bore which is considerably larger in diameter than the melt bore of the forward nozzle. The smaller forward nozzle has a backplate secured to its rear end with a thin flanged portion which extends outwardly and rearwardly into bearing contact against a rearward mold core to secure the forward nozzle in position in a well in a forward mold core. The rear face of the backplate has a seat extending around the melt bore to receive a cylindrical forward portion of a gate insert mounted on the forward end of the rearward nozzle. Thus thermal expansion of the larger rearward nozzle is taken up by the forward portion of the gate insert sliding in the seat. The smaller forward nozzle has a portion of the electrical heating element extending into a forwardly extending nose portion which provides sensitive temperature control in the gate area.

8 Claims, 1 Drawing Sheet

INJECTION MOLDING SYSTEM WITH NOZZLES IN TANDEM

BACKGROUND OF THE INVENTION

This invention relates generally to injection molding and more particularly to a hot tip gated, sprue gated or edge gated injection molding system having two heated nozzles mounted in tandem, with a smaller one in front of a larger one.

The use of an elongated nozzle having an integral electrical heater for hot tip gating is well known in the art. Examples are shown in Gellert's U.S. Pat. No. 4,238,671 which issued Dec. 9, 1980 and U.S. Pat. No. 4,557,685 which issued Dec. 10, 1985. More recent examples are shown in Gellert's Canadian patent application Ser. Nos. 542,185 filed July 15, 1987 entitled "Coated Injection Molding Nozzle and Method" and the applicant's Canadian patent application Ser. No. 549,518 filed Oct. 16, 1987 entitled "Injection Molding Nozzle Having Grounded Heating Element Brazed into Pointed Tip." While these earlier systems are completely satisfactory for many applications, in some situations where it is desirable to have a relatively lengthy melt bore leading to the cavity misalignment at the gate due to thermal expansion and contraction has been found to be a problem. Furthermore, when molding thin walled parts with a relatively short cycle time, sensitive temperature control in the gate area is critical. Also, if a single nozzle is used with a long small diameter melt bore, melt pressure drops and shear stress due to rapid flow becomes unacceptably high.

SUMMARY OF THE INVENTION

Accordingly, it is an object of the present invention to at least partially overcome the disadvantages of the prior art by providing an injection molding system having two heated nozzles mounted in tandem with provision for sufficient relative axial movement between them to provide for thermal expansion and contraction, of the larger rearward nozzle.

To this end, in one of its aspects, the invention provides a hot tip gated injection molding system comprising; a forward first elongated heated nozzle seated in a well in a forward mold core with a rear end and a forward end adjacent a gate extending from the well to a cavity, the first nozzle having a melt bore extending from an inlet at the rear end to a space surrounding the forward end leading to the gate, a backplate with a rear face having a seat therein concentrically aligned with a melt bore extending through the backplate, the backplate being mounted on the rear end of the first nozzle with the bore extending in axial alignment with the inlet to the first nozzle, the backplate having a portion which extends rearwardly into bearing contact with an upper mold core to hold the backplate and the first nozzle securely in place, a rearward second elongated heated nozzle which is substantially longer than the first nozzle seated in a well in a rearward mold core with a rear end, a forward end, and a central melt bore extending therethrough from an inlet at the rear end to the forward end, the bore being in axial alignment with the bore through the backplate and the inlet to the melt bore through the first nozzle, the forward end of the rearward nozzle having a forwardly projecting portion which is received in the seat in the rear face of the backplate to allow sliding axial movement therebetween to provide for thermal expansion and contraction of the rearward nozzle.

Further objects and advantages of the invention will appear from the following description, taken together with the accompanying drawing.

DETAILED DESCRIPTION OF THE DRAWING

Figure 1:
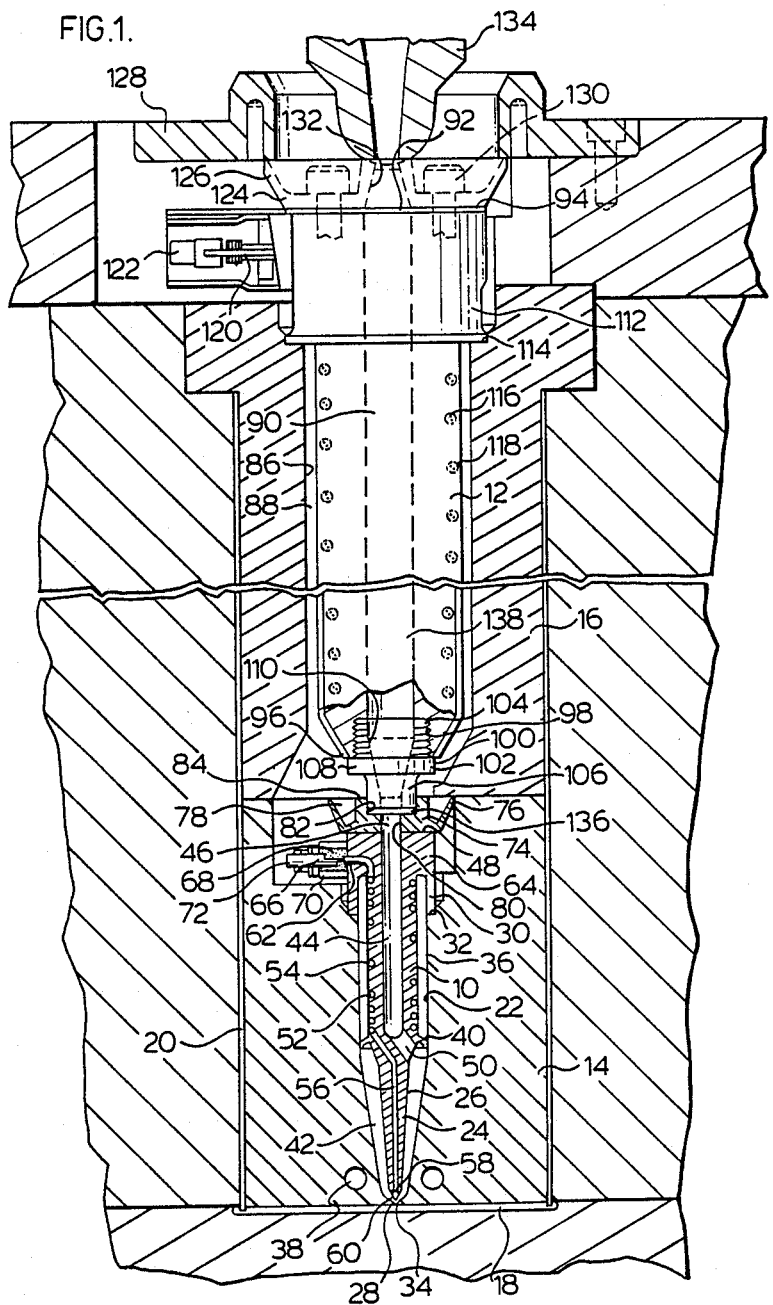
FIG. 1 is a sectional view of a portion of an injection molding system showing two elongated heated nozzles mounted in tandem according to a preferred embodiment of the invention.

Reference is made to FIG. 1 which shows one application of a preferred embodiment of the invention. In this case, a forward nozzle 10 and a rearward nozzle 12 are mounted in tandem in a forward mold core 14 and a rearward mold core 16 to provide a system to fill a cavity 18 to form a plastic top attached to the surrounding sidewalls 20 of a container. Of course, in other applications of the system, the forward and rearward mold cores 14,16 can be replaced by forward and rearward mold plates, but the concept remains the same. As can be seen, the forward nozzle 10 is seated in a well 22 in the forward mold core 14, and in this embodiment has a nose portion 24 with a tapered outer surface 26 which leads to a pointed tip 28. This nozzle 10 is described in detail in the applicant's Canadian patent application Ser. No. 549,518 entitled "Injection Molding Nozzle Having Grounded Heating Element Brazed into Pointed Tip" filed Oct. 16, 1987. It has a circumferential insulation flange 30 which sits on a circumferential shoulder 32 to locate it in the well 22 with the pointed tip 28 adjacent a gate 34 leading to the cavity 18 with an insulative airspace 36 between it and the surrounding forward mold core 14 which is cooled by cooling water flowing through cooling conduits 38. The forward nozzle 10 is also located in the well 22 by a sealing and locating flange 40 which extends circumferentially adjacent the nose portion 24. As described in detail in Gellert's Canadian patent application Ser. No. 549,519 filed Oct. 16, 1987 entitled "Injection Molding Nozzle with Resilient Sealing and Locating Flange", accurately locates the pointed tip 28 in central axial alignment with the gate 34 and prevents leakage of pressurized melt from the space 42 surrounding the nose portion 24. The forward nozzle 10 has a melt bore 44 which extends centrally from an inlet 46 at the rear end 48 of the nozzle 10 to a diagonal portion 50 which connects to the tapered surface 26 of the nose portion 24.

The forward nozzle 10 is heated by an electric heating element 52 which is integrally brazed in as described in Gellert's Canadian patent application Ser. No. 549,517 entitled "Method of Manufacture of Injection Molding Nozzle Having Grounded Heating Element Brazed into Pointed Tip" filed Oct. 16, 1987. The heating element 52 has a helical portion 54 which extends around the melt bore 44 and a longitudinal portion 56 which extends centrally in the nose portion 24. In this embodiment, the heating element 52 is suitable for low voltage such as 24 volts and has a single resistance wire which is grounded at the forward end 58 by being brazed in a nickel alloy adjacent an air-hard tool steel insert portion 60 which forms the pointed tip 28. The heating element 52 has a rear end 62 which extends radially outward through a collar portion 64 of the nozzle and is connected to a threaded stud 66. The larger diameter stud 66 is surrounded by ceramic insulation 68 inside a cylindrical sleeve 70 to form a cold terminal 72, as described in detail in the applicant's Canadian patent application Ser. No. 549,520 filed Oct. 16, 1987 entitled "Method of Manufacture of Injection Molding Nozzle Electrical Terminal." The cold terminal 72 receives a lead from an external power supply from which current flowing through to the ground at the forward end 58 heats the nozzle 10 and particularly the pointed tip 28 to a predetermined temperature. Of course, for certain applications, the longitudinal portion 56 of the heating element 52 extending through the nose portion 24 can have part with a multiple thickness of additional heat if required, as described in the applicant's Canadian patent application Ser. No. 563,981 filed Apr. 13th, 1988 entitled "Injection Molding Nozzle Having Multiple Thickness Heating Element and Method of Manufacture."

A steel backplate 74 is located against the rear end 48 of the forward nozzle 10 and has a relatively thin flanged portion 76 which extends outwardly and rearwardly across an insulative air space 78 and bears against the rearward mold core 14. Thus, as described in detail in Gellert's Canadian patent application Ser. No. 557,681 filed Jan. 29, 1988 entitled "Improved Mounting for Injection Molding Nozzle", the flanged portion 76 of the backplate 74 bearing against the rearward mold core 14 holds the backplate and the forward nozzle 10 in place without extensive heat loss to the mold core. The backplate 74 has a central melt bore 80 extending therethrough which is equal in diameter to and axially aligned with the inlet 46 to the melt bore 44 through the forward nozzle 10. The backplate 74 also has a cylindrical seat 82 in its rear face 84 which is concentrically aligned with the central melt bore 80.

The rearward nozzle 12 is similarly seated in a well 86 in the rearward mold core 14 with an insulative air space 88 between them. However, the rearward nozzle 12 is normally several times longer than the forward nozzle 10 and has a central melt bore 90 which is considerably large in diameter than the melt bore 80 through the backplate 74 and the melt bore 44 through the forward nozzle 10. As can be seen, the central melt bore 90 extends from an inlet 92 at the rear end 94 to the forward end 96 in axial alignment with the bore 80 through the backplate 74 and the inlet 46 to the melt bore 44 through the forward nozzle 10. In this embodiment, the bore 90 has a threaded mouth 98 at the forward end 96 which receives a removable gate insert 100. The gate insert 100 is similar to those shown in the applicant's Canadian patent application Ser. No. 529,897 filed Feb. 17, 1987, and Gellert's Canadian patent application Ser. No. 532,677 filed Mar. 20, 1987 and Ser. No. 549,516 filed Oct. 16, 1987. A gate insert having a separate electrical heating element is shown in Gellert's Canadian patent application Ser. No. 559,000 filed Feb. 16, 1988 entitled "Injection Molding Heated Gate Insert and Method". The gate insert 100 is made of steel with an intermediate portion 102 between a threaded cylindrical rear portion 104 and a cylindrical forward portion 106. The cylindrical forward portion 106 is made to fit in the cylindrical seat 82 in the rear face 84 of the backplate 74. The intermediate portion 102 has a hexagonal surface 108 which can be engaged by a wrench to tighten it into place. The gate insert 100 has a central melt bore 110 which extends therethrough in axial alignment between the melt bore 90 of the rearward nozzle 12 and the melt bore 80 through the backplate 74. As can be seen, the melt bore 110 through the gate insert 100 is tapered to smoothly reduce the melt bore diameter from that of the rearward nozzle 12 to that of the forward nozzle 10.

While the rearward nozzle 12 is shown with the removable gate insert 100, it can merely have a cylindrical projecting portion in place of the gate insert 100, similar to that shown in Gellert's U.S. Pat. No. 4,579,520 which issued Apr. 1, 1986. Alternatively, a hollow nozzle seal can be used to extend between the forward end 96 of the rearward nozzle 12 and the seat 82 in the rear face 84 of the backplate 74. The nozzle seal has a rear portion which is seated in the forward end 96 of the nozzle 12 and a forward nose portion which is received in the seat 82 similar to that shown in Gellert's U.S. Pat. No. 4,286,941 which issued Sept. 1, 1980. In any event, the rearward nozzle 12 is located in the well 86 in the rearward mold core 16 by an insulation flange 112 seated on a circumferential shoulder 114 in a position wherein the forward end 96 of the gate insert 100 (or equivalent in an alternate arrangement) slides in the seat 82 in the rear face 84 of the backplate 74.

The rearward nozzle 12 also has an integral electrical heating element 116 and can be made, for instance, by the methods disclosed in Gellert's U.S. Pat. No. 4,403,405 which issued Sept. 13, 1983 or Gellert's Canadian patent application Ser. No. 532,677 filed Mar. 20, 1987 entitled "Injection Molding Nozzle and Method." The heating element 116 has a helical portion 118 which extends around the central melt bore 90 and a rear end 120 which extends radially outward to a pair of cold terminals 122 which receives electrical power from external leads (not shown). In this embodiment, the heating element 116 is of the double resistance wire type and suitable for relatively high voltage such as 115 volts or 240 volts.

The rearward nozzle 12 is held securely in position by a backplate 124 having an outwardly and rearwardly flanged portion 126 which abuts against a collar 128 which is bolted to the mold. The backplate 124 is secured by bolts 130 to the rear end 94 of the rearward nozzle 12 and has a central melt bore 132 which receives pressurized melt from the nozzle 134 of a molding machine and conveys it to the inlet 92 to the rearward nozzle 12. Alternate structure can be provided to hold the rearward nozzle 12 in place in the well 86. While a single cavity system has been shown in this embodiment, of course a manifold can be used to distribute the melt in a multi-cavity system as well.

In use, after the injection molding system has been assembled as shown and described above, electrical power is applied to the heating elements 52 and 116 to heat both nozzles 10 and 12 to a predetermined operating temperature. When the longer rearward nozzle 12 heats up, the forward portion 106 of the gate insert 100 slides in the seat 82 to narrow or eliminate the gap between them. As the rearward nozzle 12 is considerably longer than the forward nozzle 10 it will be appreciated that this takes up the thermal expansion of the rearward nozzle 12 in the seat 82 substantially reduces movement of the pointed tip 28 of the forward nozzle 10 due to thermal expansion and contraction which can otherwise result in the pointed tip 28 being out of position in the gate 34. Of course, if the pointed tip 28 is not accurately located relative to the gate 34, the gate will become too hot or too cold or heat distribution will be unequal and malfunction will quickly occur. The alignment of the forward and rearward nozzles 10,12 provides a continuous straight melt passage 138 from the nozzle 134 of the molding machine through the backplate 124, the rearward nozzle 12, the gate insert 100 and the backplate 74 to the forward nozzle 10. Pressurized melt is introduced from the molding machine nozzle 134 and flows through the melt passage 138 to the space 42 surrounding the nose portion 24 of the forward nozzle and from there through the gate 34 to fill the cavity 18. As described above the diameter of the melt bore 90 of the rearward nozzle 16 is considerably larger in diameter than the melt bore 44 of the forward nozzle 10. As the rearward nozzle is considerably longer, this substantially reduces pressure drop and shear stress, as the melt flow through the system. The space 42 remains filled with melt, a portion of which solidifies adjacent the cooled forward mold core 14 and the sealing and locating flange 40, preventing it escaping into the insulative air space 36. After the cavity 34 is filled, injection pressure is held momentarily to pack and then released. After a short cooling period, the mold is opened to eject the container. After ejection, the mold is closed and injection pressure is reapplied to fill the cavity 34. This cycle is repeated continuously with a frequency dependent on the size and shape of the cavity and the type of material being molded. The small size of the forward nozzle 10 and the longitudinal portion 56 of the heating element 52 extending into the nose portion provide relatively sensitive temperature control in the gate area which is critical to superior performance with some materials.

While the description of this system and its use have been given with respect to a preferred embodiment, it is not to be construed in a limiting sense. Variations and modifications will occur to those skilled in the art. For instance, while the smaller forward nozzle 10 is shown having a nose portion 24 with a pointed tip 28 for hot tip gating, it can have a configuration to provided edge gating or sprue gating. Reference is made to the appended claims for a definition of the invention.

What we claim are:
1. An injection molding system comprising:
(a) a forward first elongated heated nozzle having a rear end and a forward end seated in a well in a forward mold core, said first nozzle adjacent a gate extending, from the well to a cavity, the first nozzle having a first bore extending from an inlet at the rear end to a space surrounding the forward end leading to the gate,
(b) a backplate with a rear face having a seat therein, said seat concentrically aligned with a second melt bore extending through the backplate, the backplate being mounted on the rear end of the first nozzle with the second melt bore extending in axial alignment with the inlet to the first nozzle, the backplate having a portion which extends rearwardly into bearing contact with an upper mold core, said upper mold core holding the backplate and the first nozzle securely in place,
(c) a rearward second elongated heated nozzle having a rear end, a forward end and a central third melt bore, said second nozzle being substantially longer than the first nozzle and being seated in a well in a rearward mold core said central third melt bore extending through said second nozzle from an inlet at the rear end of said second nozzle to the forward end of said second nozzle, the third melt bore being in axial alignment with the second melt bore through the backplate and the inlet to the first melt bore through the first nozzle, the forward end of the rearward nozzle having a forwardly projecting portion which is received in the seat in the rear face of the backplate to allow sliding axial movement between said forwardly projecting portion and said seat to provide for thermal expansion and contraction of the rearward nozzle.

2. An injection molding system as claimed in claim 1 wherein the forward nozzle has a nose portion at the forward end with a portion of an electrical heating element integrally brazed into the nose portion.

3. An injection molding system as claimed in claim 2 wherein the nose portion extends to a pointed tip which is adjacent to and in central axial alignment with the gate to provide a hot tip gated system.

4. An injection molding system as claimed in claim 3 wherein the forwardly projecting portion of the forward end of the rearward nozzle is provided by a gate insert, said gate insert having a threaded cylindrical rear portion which is screwed into the forward end of the rearward nozzle, a cylindrical forward portion which is received in the seat in the rear face of the backplate, and a central fourth melt bore extending through said gate insert in axial alignment between the third melt bore through the rearward nozzle and the second melt bore through the backplate.

5. An injection molding system as claimed in claim 3 wherein the forwardly projecting portion of the forward end of the rearward nozzle is provided by a nozzle seal, said nozzle seal having a rear portion which is seated in the forward end of the rearward nozzle, a forward nose portion which is received in the seat in the rear face of the backplate, and a central fourth melt bore extending through said nozzle seal in axial alignment between the third melt bore through the rearward nozzle and the second melt bore through the backplate.

6. An injection molding system as claimed in 4 or 5 wherein the rearwardly extending portion of the backplate is a relatively thin flanged portion which extends outwardly and rearwardly into bearing contact against the upper mold core.

7. An injection molding system as claimed in claim 4 or 5 wherein the third melt bore through the rearward nozzle is larger in diameter than the first melt bore through the forward nozzle.

8. An injection molding system as claimed in claim 4 or 5 wherein the rearward nozzle has a high voltage integral electrical heating element and the forward nozzle has a low voltage integral electrical heating element.

* * * * *